Aug. 27, 1957  H. M. KENNEDY  2,804,221
GRAPPLE TYPE LOADER
Filed June 2, 1955  3 Sheets-Sheet 3
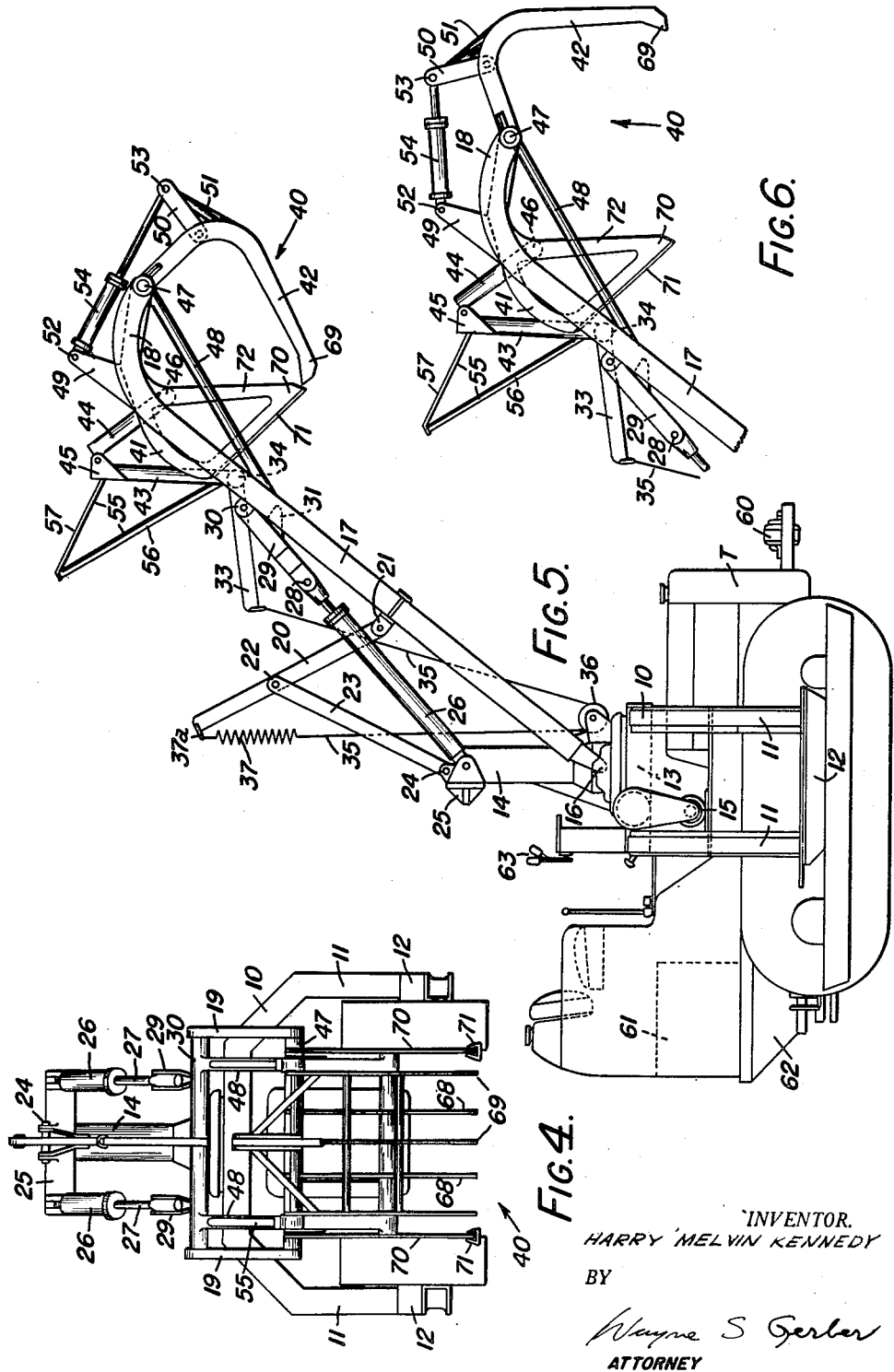
INVENTOR.
HARRY MELVIN KENNEDY
BY
Wayne S Gerber
ATTORNEY

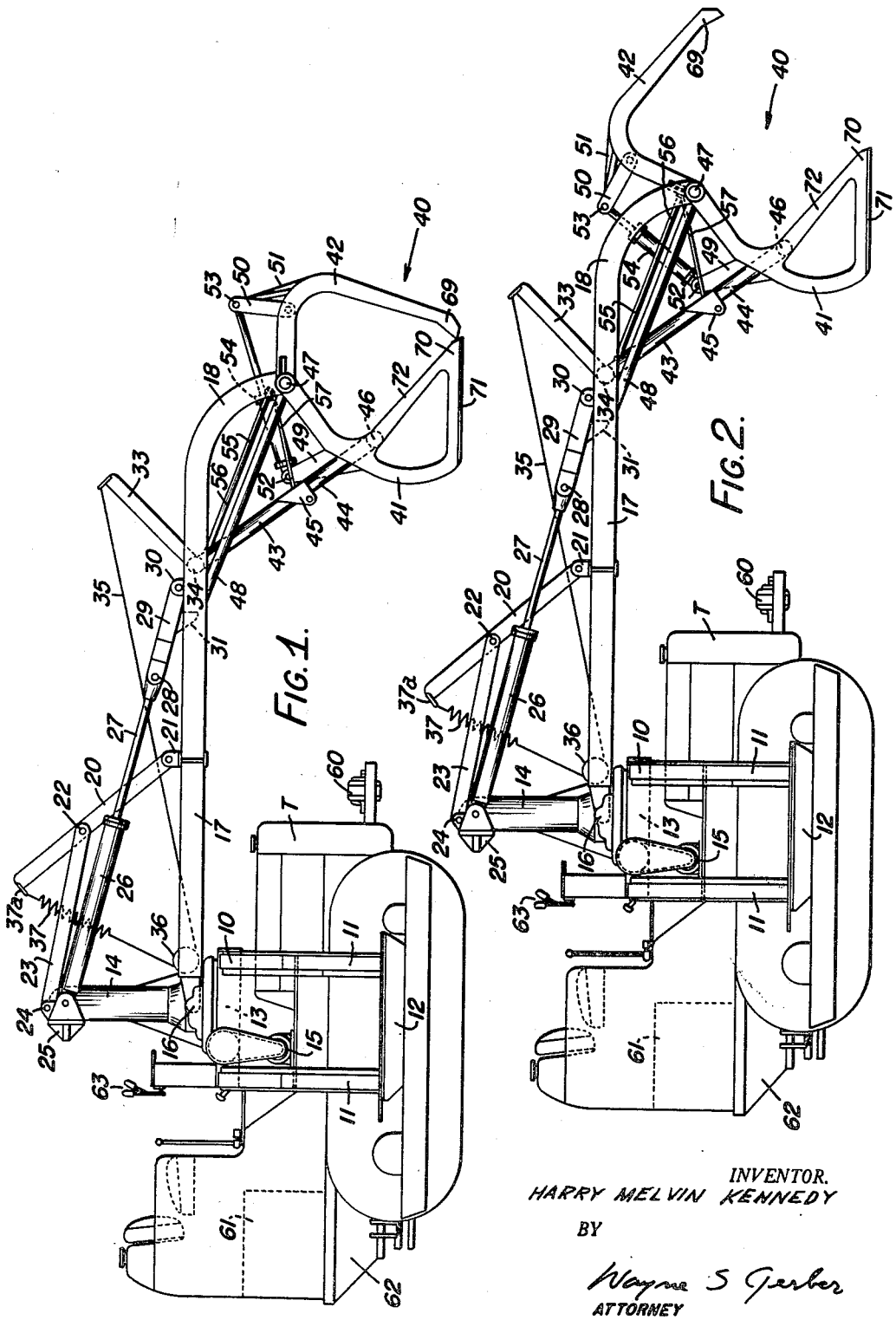

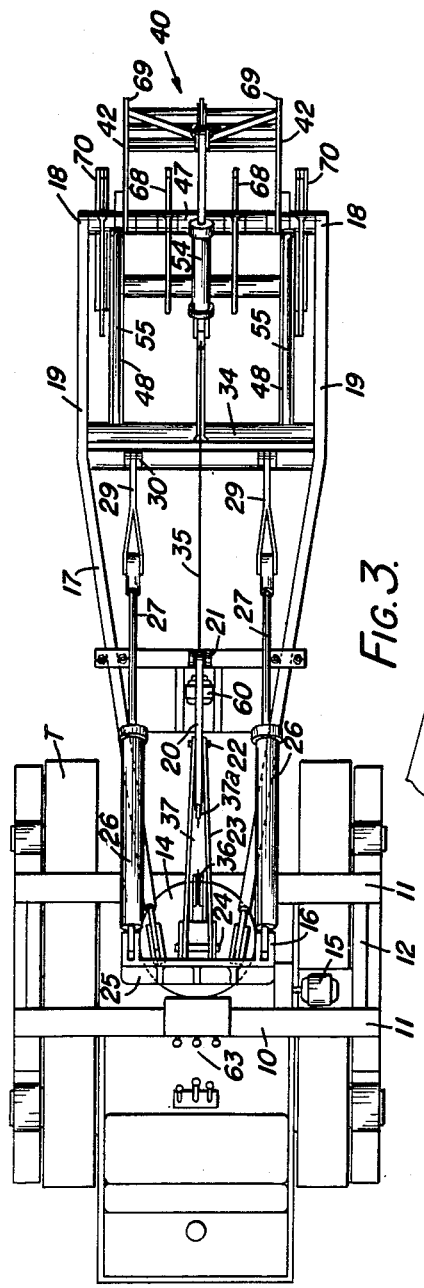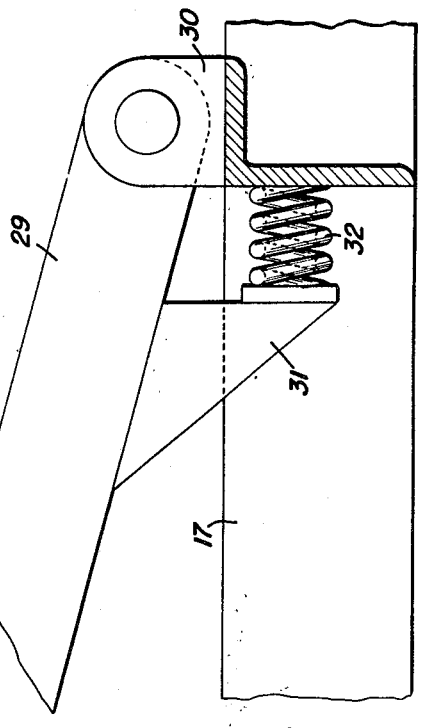

… … …

United States Patent Office 2,804,221
Patented Aug. 27, 1957

2,804,221

GRAPPLE TYPE LOADER

Harry Melvin Kennedy, Bucyrus, Ohio, assignor to The Superior Equipment Company, Bucyrus, Ohio, a corporation of Ohio Application June 2, 1955, Serial No. 512,597

7 Claims. (Cl. 214—147)

This invention pertains to loading apparatus in the nature of a crane and in particular to grapple type loaders. The present invention is adapted for mounting on mobile units, such as tractors.

It is an object of this invention to provide a grapple type loader for handling rapidly large amounts of various materials or products, for example, sugar cane and the like.

It is a further object of this invention to provide a grapple type loader which is easily manipulated by the operator.

A further object of this invention is to provide a grapple type loader which functions as an independent unit relying only upon the tractor for a mobile mounting base plus the ability of the tractor to furnish a source of power for the hydraulic system.

Still a further object of this invention is to provide a grapple type loader of the type stated which is divorced from all tractor fluctuations, either self-administrated or topographically induced.

Another object of this invention is to provide a grapple type loader which can assume a number of separate positions quickly and effectively.

Still another object of this invention is to provide a grapple type loader which is particularly adapted to loading sugar cane, and which is simple in construction and readily manufactured.

Another object of this invention is to provide a grapple type sugar cane loader which can be serviced with a minimum of difficulty.

Yet another object of this invention is to provide a grapple type sugar cane loader which is rugged in construction to permit operation under the most severe loading conditions.

These and other objects and advantages of this invention will be apparent from the following description and claims.

In the accompanying drawings which illustrate by way of example various embodiments of this invention:

Fig. 1 is a side elevational view showing the loader mounted upon a tractor with the boom lowered and the grapple in closed position;

Fig. 2 is a side elevation similar to Fig. 1 with the grapple in open position;

Fig. 3 is a top plan view of the loader mounted upon a tractor;

Fig. 4 is a front elevational view of the loader mounted upon a tractor;

Fig. 5 is a side elevational view of the loader mounted upon a tractor, the boom in elevated position and the grapple closed;

Fig. 6 is a fragmentary side elevational view of the boom in raised position with the grapple open; and Fig. 7 is an enlarged side elevational view, partly in section, showing the link and spring construction in connection with the boom.

Figs. 1 through 5 show a tractor T to which is secured a mounting frame 10 having yoke members 11 which straddle tractor T and are connected thereto by adaptor brackets 12. Secured to yoke members 11 is a base support 13. A hydraulic revolving mast assembly 14 is mounted upon the base 13 and is rotatable within an arc of 220° by means of a hydraulic motor assembly 15. Mounted on pivots 16 at the bottom of the mast assembly 14 is a boom member 17 having a downwardly curved end structure 18. The boom 17 comprises a pair of beams 19. Beams 19 are angularly disposed with respect to each other. Boom 17 has connected to it short of dead-center an elevation bar 20 which is pivotally connected to boom 17 by mounting bracket 21.

Connected to elevation bar 20 at pivot 22 are guide links 23. The guide links 23 are connected to mast assembly 14 at pivots 24. Mounted upon the mast assembly 14 is a bracket member 25 to which are pivotally connected (hydraulically operated telescopic struts) hydraulic cylinders 26 having pistons 27 which are pivotally connected at 28 to over-center cylinder links 29 which are in turn pivotally connected past dead-center to boom 17 at bracket 30.

Overcenter cylinder links 29 have an extending bumper 31. A compression link spring 32 is mounted between each bracket 30 and corresponding bumper 31 for reasons hereinafter described. An actuating arm 33 is mounted upon a pivot member 34 which connects beams 19 of boom 17. An actuating cable 35 is fastened to the end of actuating arm 33 and passes rearwardly through an actuating sheave 36 mounted on mast assembly 14. Actuating cable 35 passes about actuating sheave 36 and is connected to tension spring 37. Tension spring 37 is in turn connected to 37a to elevation bar 20 for reasons hereinafter stated.

Referring now to grapple structure 40, it comprises a rake grapple 41 and a front grapple hook 42. Upper push arms 43 are connected to pivot member 34 and actuated by actuating arm 33. Lower push arms 44 are hinged to upper push arms 43 by locking mechanisms 45. Lower push arms 44 are connected to rake grapple 41 at pivot 46.

Rake grapple 41 and front grapple hook 42 are pivotally connected to boom 17, by pin 47. Bracing members 48 brace the lower end of boom 17 and extend from pin 47 to pivots 30 on boom 17. Rake grapple 41 has mounted thereon an upright arm 49. Front grapple hook 42 has an arm 50 rigidly held in place by supporting braces 51. Pivotally connected to arms 49 and 50 at pivots 52 and 53 respectively is an hydraulic cylinder and piston assembly 54. Connected to link locking mechanisms 45 are pressure locking arm braces 55 each of which comprises a pair of struts 56 and 57 which are united to form an acute angle. Struts 56 are rigidly connected to pivot member 34 and struts 57 are rigidly connected to locking mechanisms 45.

Hydraulic lines (not shown) connect hydraulic cylinders 54 and 26 with hydraulic pump 60 on tractor T. An hydraulic oil tank 61 located in the rear of tractor T above a counterweight support platform 62 feeds oil to the hydraulic pump for operating the hydraulic motor assembly 15, and the hydraulic cylinders 26 and 54. Control levers 63 are mounted upon the mounting frame 10 to provide easy access from the operator's position on tractor T.

The rake grapple 41 and the front grapple hook 42 which comprise grapple 40 include a number of tines 68 and 69 respectively which provide means for scooping and grappling the material to be loaded. It is to be noted that rake grapple 41 has outer tines 70 which have a flat bottom travel surface 71 and an inclined forward surface 72 to facilitate handling of the sugar cane or other material which is to be loaded.

Operation

The operation of the loader will be described in connection, for example, with the loading of sugar cane. It is to be understood, however, that the loader shown and described herein can be used for applications other than cane loading. When sugar cane is to be loaded the operation is as follows:

Sugar cane is so cut and piled as to require a forward moving gathering device such as rake grapple 41. It is imperative that the raking operation be performed with the front grapple hook 42 raised as far as possible to permit the hook to clear all sugar cane forward of the rake grapple 41. This permits the front grapple hook 42 to take a sizable bite during the loading operation. The opening and closing of front grapple hook 42 is done by double acting hydraulic cylinder 54.

To insure the rake grapple 41 maintaining proper raking position, each side of the grapple is held in position by a set of push arms 43 and 44. Locking arm braces 55 maintain the push arms 43 and 44 in locked position during the raking process in such manner that front grapple hook 42 when in raking position maintains constant pressure against the push arms 43 and 44 insuring an automatically locked position regardless of the nature of the terrain. The below center hinge point at locking mechanism 45 of the push arms 43 and 44 produces a tremendous locking pressure once the push arms 43 and 44 are properly positioned and rake grapple 41 is in contact with the load. Because of the constant pressure maintained by the pressure locking arm braces 55, the load is distributed throughout the boom 17, rake grapple 41 and push arms 43 and 44.

It is obvious that push arms 43 and 44, once they have successfully accomplished their purpose must be so revolved that they will permit the grapple 40 to be maneuvered into the most advantageous unloading position, which necessitates the activating of locking mechanism 45. To accomplish unlocking of the push arms 43 and 44 and swinging of the loaded grapple 40, the automatic actuating device works as follows:

When the push boom 17 is raised by retraction of pistons 27 in cylinders 26, the relationship between the elevation bar 20 and the actuating sheave 36 changes, shortening the distance between sheave 36 and anchor end of actuating arm 33. Thus, the shortening of cable 35 between sheave 36 and actuating arm 33 tends to rotate actuating arm 33 in a counter-clockwise direction which motion is transferred to upper push arm 43 thereby disengaging locking mechanisms 45 permitting push arms 43 and 44 to hinge as shown in Figure 5 and Figure 6. As the boom 17 lifts grapple 40, the disengaging of push arms 43 and 44 plus transfer of the center of gravity tends to rotate grapple 40 in various directions. To alleviate shock loads and maintain a smooth, uniform travel path, the tension spring 37 is used for transfer of loads so that a constant cable pull is maintained throughout the entire loading cycle. This enables rake grapple 41 to assume an unloading position as shown in Figure 5. By contracting the piston assembly in hydraulic cylinder 54, the grapple 40 is opened thus enabling the load to be cleared instantaneously as shown in Figure 6.

It must be stressed that a floating boom is most necessary to maintain a raking position at all times. This is accomplished through cylinder links 29 with attached compression springs 32. Should rake grapple 41 assume a position higher than the tractor T, the compression spring 32 is so adjusted that pivot 28 will not pass below the center line of the cylinder 26, piston 27, and overcenter cylinder link 29. The cylinder 26 and piston 27 and overcenter cylinder link 29 will therefore be forced to pivot on pivot 28 in an upward or skyward direction. Minor depressions and rises in ground contours are absorbed by compression spring 32 enabling rake grapple 41 to maintain ground contact at all times which is most essential if efficient gathering of cane is to be accomplished.

The loader may be adapted to a truck or other vehicle but is particularly adaptable to tractors. As previously mentioned, a hydraulic pump 60 is incorporated into the tractor's T front power-take-off with a gravity feed source of oil from hydraulic tank 61. The pump 60 is the source of power for hydraulic cylinders 26 and hydraulic cylinder assembly 54 as well as hydraulic motor 15 which is used to revolve the mast assembly 14 approximately 110° in either direction from the longitudinal axis of the tractor T. Boom hoisting and lowering, front grapple hook positioning and slewing, are all accomplished by proper manipulation of three hydraulic valve operating levers 63. The counterweight 62 maintains tractor balance and supports hydraulic oil tank 61.

While the invention has been described in connection with different embodiments thereof, it will be understood that it is capable of further modification, and this application is intended to cover any variations, uses, or adaptations of the invention following, in general, the principals of the invention and including such departures from the present disclosure as come within known or customary practice in the art to which the invention pertains, and as may be applied to the essential features herein set forth and as fall within the scope of the invention or the limits of the appended claims.

Having thus described my invention, what I claim is:

1. A loading apparatus comprising an hydraulically rotatable mast, a boom pivotally connected to said mast, said boom having a downwardly curved end, a grapple pivotally mounted on the end of said boom, hydraulic means for raising and lowering said boom, hydraulic means for opening and closing said grapple, an actuating arm pivotally mounted on said boom, an upper push-arm connected to said actuating arm and operable thereby, a lower push-arm pivotally connected to said grapple a hinge locking mechanism connecting said push-arms for locking said grapple against pivotal movement, a pressure locking arm brace comprising two angularly connected struts one of which is rigidly connected to said locking mechanism and the other of which is rigidly connected to said actuating arm, an elevation bar pivotally mounted on said boom short of dead-center, a guide link one end of which is pivotally connected to the top of said mast and the other end of which is pivotally connected to said elevation bar, an actuating sheave mounted at the base of said mast, a tension spring connected to the free end of said elevation bar, and an actuating cable passing about said sheave one end of which is connected to said tension spring and the other end of which is connected to the free end of said actuating arm to actuate said arm and thereby to unlock said hinge locking mechanism when said hydraulic strut is retracted to raise said boom.

2. A loading apparatus comprising an hydraulically rotatable mast, a boom pivotally connected to said mast, said boom having a downwardly curved end, a grapple pivotally mounted on the end of said boom, hydraulic means for raising and lowering said boom, hydraulic means for opening and closing said grapple, an actuating arm pivotally mounted on said boom, an upper push-arm connected to said actuating arm and operable thereby, a lower push-arm pivotally connected to said grapple, a hinge locking mechanism connecting said push-arms for locking said grapple against pivotal movement, a pressure locking arm brace comprising two angularly connected struts one of which is rigidly connected to said locking mechanism and the other of which is rigidly connected to said actuating arm, an elevation bar pivotally mounted on said boom short of dead-center, a guide link one end of which is pivotally connected to the top of said mast and the other end of which is pivotally connected to said elevation bar, an actuating sheave mounted at the base of said mast, a tension spring connected to the free end of said elevation bar, an actuating cable passing about said sheave one end of which is connected to said tension spring and the other end of which is connected to the free end of said actuating arm to actuate said arm and thereby to unlock said hinge locking mechanism when said hydrualic strut is retracted to raise said boom, and an adaptor frame supporting said mast for mounting said loading apparatus upon a tractor.

3. A loading apparatus in combination with a tractor having an hydraulic pump and motor assembly, comprising an hydraulically rotatable mast mounted upon said tractor, a boom pivotally connected to said mast, said boom having a downwardly curved end, a grapple pivotally mounted on the end of said boom, hydraulic means for raising and lowering said boom, hydraulic means for opening and closing said grapple, an actuating arm pivotally mounted on said boom, an upper push-arm connected to said actuating arm and operable thereby, a lower push-arm pivotally connected to said grapple, a hinge locking mechanism connecting said push-arms for locking said grapple against pivotal movement, a pressure locking arm brace comprising two angularly connected struts one of which is rigidly connected to said locking mechanism and the other of which is rigidly connected to said actuating arm, an elevation bar pivotally mounted on said boom short of dead-center, a guide link one end of which is pivotally connected to the top of said mast and the other end of which is pivotally connected to said elevation bar, an actuating sheave mounted at the base of said mast, a tension spring connected to the free end of said elevation bar, and an actuating cable passing about said sheave one end of which is connected to said tension spring and the other end of which is connected to the free end of said actuating arm to actuate said arm and thereby to unlock said hinge locking mechanism when said hydraulic strut is retracted to raise said boom.

4. A loading apparatus comprising an hydraulically rotatable mast, said mast being rotatable approximately 110° in either directon of forward position, a boom pivotally connected to said mast, said boom having a downwardly curved end, a grapple pivotally mounted on the end of said boom, hydraulic means for raising and lowering said boom, hydraulic means for opening and closing said grapple, an actuating arm pivotally mounted on said boom, an upper push-arm connected to said actuating arm and operable thereby, a lower push-arm pivotally connected to said grapple, a hinge locking mechanism connecting said push-arms for locking said grapple against pivotal movement, a pressure locking arm brace comprising two angularly connected struts one of which is rigidly connected to said locking mechanism and the other of which is rigidly connected to said actuating arm, an elevation bar pivotally mounted on said boom short of dead-center, a guide link one end of which is pivotally connected to the top of said mast and the other end of which is pivotally connected to said elevation bar, an actuating sheave mounted at the base of said mast, a tension spring connected to the free end of said elevation bar, and an actuating cable passing about said sheave one end of which is connected to said tension spring and the other end of which is connected to the free end of said actuating arm to actuate said arm and thereby to unlock said hinge locking mechanism when said hydraulic strut is retracted to raise said boom.

5. A loading apparatus comprising a rotatable mast, a boom pivotally connected to said mast, said boom having a downwardly curved end, a grapple pivotally mounted on the end of said boom, means for raising and lowering said boom, means for opening and closing said grapple, an actuating arm pivotally mounted on said boom, an upper push-arm connected to said actuating arm and operable thereby, a lower push-arm pivotally connected to said grapple, a hinge locking mechanism connecting said push-arms for locking said grapple against pivotal movement, a pressure locking arm brace comprising two angularly connected struts one of which is rigidly connected to said locking mechanism and the other which is rigidly connected to said actuating arm, an elevation bar pivotally mounted on said boom short of dead-center, a guide link one end of which is pivotally connected to the top of said mast and the other end of which is pivotally connected to said elevation bar, an actuating sheave mounted at the base of said mast, a tension spring connected to the free end of said elevation bar, and an actuating cable passing about said sheave one end of which is connected to said tension spring and the other end of which is connected to the free end of said actuating arm to actuate said arm and thereby to unlock said hinge locking mechanism when said telescopic strut is retracted to raise said boom.

6. A loading apparatus comprising an hydraulically rotatable mast, a boom pivotally connected to said mast, said boom having a downwardly curved end, a grapple pivotally mounted on the end of said boom, hydraulic means for raising and lowering said boom, hydraulic means for opening and closing said grapple, an actuating arm pivotally mounted on said boom, an upper push-arm connected to said actuating arm and operable thereby, a lower push-arm pivotally connected to said grapple, a hinge locking mechanism connecting said push-arms for locking said grapple against pivotal movement, a pressure locking arm brace comprising two angularly connected struts one of which is rigidly connected to said locking mechanism and the other of which is rigidly connected to said actuating arm, and elevation bar pivotally mounted on said boom short of dead-center, a guide link one end of which is pivotally connected to the top of said mast and the other end of which is pivotally connected to said elevation bar, an actuating sheave mounted at the base of said mast, and an actuating cable passing about said sheave one end of which is connected to said elevation bar and the other end of which is connected to the free end of said actuating arm to actuate said arm and thereby to unlock said hinge locking mechanism when said hydraulic strut is retracted to raise said boom.

7. A loading apparatus comprising an hydraulically rotatable mast, a boom pivotally connnected to said mast, said boom having a downwardly curved end, a grapple pivotally mounted on the end of said boom, hydraulic means for raising and lowering said boom, hydraulic means for opening and closing said grapple, an actuating arm pivotally mounted on said boom, a hinged locking brace pivotally connected to said boom at one end and to said grapple at the other end for locking said grapple against pivotal movement, a pressure locking arm brace comprising two angularly connected struts one of which is rigidly connected to said hinged locking brace, and the other of which is rigidly connected to said actuating arm, an elevation bar pivotally mounted on said boom short of dead-center, a guide link one end of which is pivotally connected to the top of said mast and the other end of which is pivotally connected to said elevation bar, an actuating sheave mounted at the base of said mast, and an actuating cable passing about said sheave one end of which is connected to the free end of said elevation bar, and the other end of which is connected to the free end of said actuating arm to actuate said arm and thereby to unlock said hinged locking brace when said hydraulic strut is retracted to raise said boom.

References Cited in the file of this patent

UNITED STATES PATENTS

| 1,507,064 | Jones | Sept. 2, 1924 |
| 1,765,163 | Keiser | June 17, 1930 |
| 2,445,076 | Munson | July 13, 1948 |
| 2,674,385 | Stauth et al. | Apr. 6, 1954 |